US005189302A

United States Patent [19]

Roberts et al.

[11] Patent Number: 5,189,302
[45] Date of Patent: Feb. 23, 1993

[54] SMALL SYSTEM FOR TRITIUM ACCELERATOR MASS SPECTROMETRY

[75] Inventors: Mark L. Roberts; Jay C. Davis, both of Livermore, Calif.

[73] Assignee: The United States of America as represented by the United States Department of Energy, Washington, D.C.

[21] Appl. No.: 783,803

[22] Filed: Oct. 28, 1991

[51] Int. Cl.[5] ........................ B01D 59/44; H01J 49/40

[52] U.S. Cl. .................................. 250/288; 250/293; 250/296

[58] Field of Search ................ 250/281, 293, 296, 288

[56] References Cited

U.S. PATENT DOCUMENTS

| | | |
|---|---|---|
| H75 | 6/1986 | Grisham et al. . |
| 3,885,155 | 5/1975 | Anbar . |
| 4,390,784 | 6/1983 | Browning et al. . |
| 4,490,648 | 12/1984 | Lancaster et al. . |
| 4,666,651 | 5/1987 | Barjon et al. . |
| 4,762,993 | 8/1988 | Moses . |
| 4,801,847 | 1/1989 | Sakudo et al. . |
| 4,812,775 | 3/1989 | Klinkostein et al. . |
| 4,973,841 | 11/1990 | Purser . |
| 5,013,923 | 5/1991 | Litherland et al. . |
| 5,086,256 | 2/1992 | Tokiguchi et al. ............ 250/423 R |

OTHER PUBLICATIONS

[Preprint] Vogel et al. "Application of AMS to the Biomedical Sciences", presented at the Fifth International Conference on Accelerator Mass Spectrometry held in Paris, France, Apr. 1990.

[Preprint] Felton et al. "Accelerator Mass Spectrometry in the Biomedical Sciences: Applications in Low--Exposure Biomedical and Environmental Dosemetry", presented at the Fifth International Conference on Accelerator Mass Spectrometry held in Paris, France, Apr. 1990.

[Preprint] Davis et al., "LLNL/UC AMS Facility and Research Program," prepared for submittal to the Fifth International Conference on Accelerator Mass Spectrometry, Paris, France, Apr. 23-27, 1990.

King et al., "Detection of Tritium Using Accelerator Mass Spectrometry" *Nuclear Instruments and Methods in Physics Research, B29,* pp. 14–17 (1987).

Middleton et al., "Tritium Measurements with a Tandem Accelerator", *Nuclear Instruments and Methods in Physics Research B47,* p. 409 (1990).

Songsheng et al., "Determination of Tritium Using a Small Van de Graaff Accelerator", *Nuclear Instruments and Methods in Physics Research B5,* p. 226 (1984).

Proctor et al., *Nuclear Instruments and Methods in Physics Research B52,* p. 334 (1990).

Bronk et al., *Radiocarbon 31,* p. 298 (1989).

Turtletaub et al., *Proc. Natl. acad. Sci.* (USA) 87: 5288–5292 (Jul. 1990).

Proctor, *Nuclear Instruments and Methods in Physics Research B40/41:* 727–730 (1989).

Davis, *Nuclear Instruments and Methods in Physics Research B40/41:* 705–708 (1989).

*Primary Examiner*—Bruce C. Anderson
*Attorney, Agent, or Firm*—Henry P. Sartorio; Roger S. Gaither; William R. Moser

[57] ABSTRACT

Apparatus for ionizing and accelerating a sample containing isotopes of hydrogen and detecting the ratios of hydrogen isotopes contained in the sample is disclosed. An ion source generates a substantially linear ion beam including ions of tritium from the sample. A radio-frequency quadrupole accelerator is directly coupled to and axially aligned with the source at an angle of substantially zero degrees. The accelerator accelerates species of the sample having different mass to different energy levels along the same axis as the ion beam. A spectrometer is used to detect the concentration of tritium ions in the sample. In one form of the invention, an energy loss spectrometer is used which includes a foil to block the passage of hydrogen, deuterium and $^3$He ions, and a surface barrier or scintillation detector to detect the concentration of tritium ions. In another form of the invention, a combined momentum/energy loss spectrometer is used which includes a magnet to separate the ion beams, with Faraday cups to measure the hydrogen and deuterium and a surface barrier or scintillation detector for the tritium ions.

10 Claims, 1 Drawing Sheet

SMALL SYSTEM FOR TRITIUM ACCELERATOR MASS SPECTROMETRY

The United States Government has rights in this invention pursuant to Contract No. W-7405-ENG-48 between the U.S. Department of Energy and the University of California, for the operation of the Lawrence Livermore National Laboratory.

CROSS-REFERENCE TO RELATED APPLICATIONS

"Method for Detection of Long-Lived Radioisotopes in Small Biochemical Samples", Ser. No. 07/669,385, filed Apr. 26, 1991, by Kenneth W. Turteltaub, John S. Vogel, James S. Felton, Barton L. Gledhill and Jay C. Davis.

BACKGROUND OF THE INVENTION

The present invention relates to a dedicated small scale system suitable for biomedical applications which measures the concentration of tritium in a sample containing other species of hydrogen.

The use of radioactive isotopes in various molecules as labels to track metabolic processes is well known in the arts of medicine and the biosciences. The samples available for analysis in such testing and research are typically very small, in the range of 10 micrograms (ug) to 1 milligram (mg). Obtaining a measurement with the required accuracy from such a small sample is often very difficult. Attempts to measure the concentration of the radioactive isotope directly by decay counting may not provide the required accuracy. Unfortunately, decay analysis techniques from small samples require the use of an isotope with a relatively rapid rate of decay for proper operation.

The heretofore required use of short half-life isotopes, i.e., isotopes which relatively rapidly decay to a non-radioactive state, has a variety of undesirable consequences. For obvious reasons, the isotope has a short shelf-life, making it difficult to maintain in stock and inconvenient for routine test procedures. Any use of the isotope must account for its state of decay at the outset of the test, and the accuracy of the analysis is limited both by the difficulty in accurately measuring concentrations by decay techniques and the instability of the starting material. Such isotopes often cannot be used for long term tests, and are limited to tests which require only a short time to complete. The radioactivity may make the isotope potentially hazardous to the user, and it is difficult to avoid contamination of the equipment. The limitation on half-life means that isotopes which might otherwise be desirable cannot be used because their half-life is unacceptably long. Finally, the short half-life of the isotope often means that it must be attached to the sample shortly before the initiation of the test, typically requiring surface bonding techniques which do not always adequately bond the isotope to the sample.

In the geosciences, the use of radioactive isotopes with a relatively long half-life for analysis and testing is well known. The samples available in the geosciences are typically large relative to the samples available in medicine and the biosciences, and techniques exist for directly detecting the concentration of the isotopes with the necessary accuracy without relying on an analysis of their rate of decay. One such technique is generally known as accelerator mass spectrometry (AMS), and involves the acceleration of the radioactive particle in ionized form, measuring its concentration in the sample by deflecting the accelerated beam into components based on relative mass, and comparing the concentrations in the respective beams.

Recent research involving the application of AMS to the biomedical sciences, performed by the assignee of this application, is reported in "Application of AMS to the Biomedical Sciences" and "Accelerator Mass Spectrometry in the Biomedical Sciences: Applications in Low-Exposure Biomedical and Environmental Dosimetry", presented at the Fifth International Conference on Accelerator Mass Spectrometry held in Paris, France in April., 1990. Those papers discuss the potential uses of AMS in biomedicine, and the radioisotopes, particularly carbon 14, which may be useful. However, those papers do not provide an explanation of the actual techniques used to perform the spectrographic analysis.

One isotope which has found various applications in the biomedical sciences as well as other fields is tritium, a species of hydrogen having an atomic mass of 3 (i.e., one proton and two neutrons). Tritium exists naturally, and it can also be produced artificially. Tritium has practical uses as a label for biomedical substances of interest. Tritium can be detected using decay (typically beta) techniques, but only with sample sizes or tritium concentrations which are often too large to be practical for many biomedical or clinical purposes.

The direct detection of tritium using AMS in sample sizes sufficiently small for biomedical research has been the subject of several recent studies. For example, in "Detection of Tritium Using Accelerator Mass Spectrometry", King et al., *Nuclear Instruments and Methods in Physics Research B*29 (1987) 14, a cyclotron is used to accelerate the tritium, an aluminum shield blocks $^3$He and other undesired particles, and the remaining particles pass through a $\Delta$E-E detector. A tandem accelerator is used in "Tritium Measurements with a Tandem Accelerator", Middleton et al., *Nuclear Instruments and Methods in Physics Research B*47 (1990) 409. A Van de Graaff accelerator is used in "Determination of Tritium using a Small Van de Graaff Accelerator", Songsheng et al., *Nuclear Instruments and Methods in Physics Research B*5 (1984) 226. However, all post tritium AMS techniques require relatively large, complex devices which are impractical for most biomedical applications.

SUMMARY OF THE INVENTION

The present invention provides an apparatus for measuring hydrogen isotope ratios. An ion source converts a portion of a particular sample to a beam of charged particles. A radio-frequency quadrupole accelerator, directly coupled to and axially aligned with the source at an angle of substantially zero degrees, accelerates those particles to different energies. A spectrometer is used to measure the particles of interest.

In one form of the invention, an energy loss spectrometer is used which includes a foil to block the passage of hydrogen, deuterium and $^3$He ions, and a surface barrier or scintillation detector is used to detect the tritium ions. In another form of the invention, a combined momentum/energy loss spectrometer is used which includes a magnet to separate the ion beams, with Faraday cups to measure the hydrogen and deuterium ion currents and a surface barrier or scintillation detector for counting tritium ions.

The apparatus of the present invention provides a relatively small, compact and inexpensive device to detect relative concentrations of tritium to hydrogen over the dynamic range of $1:10^8$ to $1:10^{12}$. Sample sizes in the range of 10 micrograms (ug) to 1 milligram (mg) can be measured with acceptable accuracy for biomedical research. The convenience and accuracy with which tritium can be measured using the apparatus of the present invention is expected to significantly expand the utility of the use of tritium as a label in clinical studies.

DESCRIPTION OF THE PREFERRED EMBODIMENTS

Figure 1:
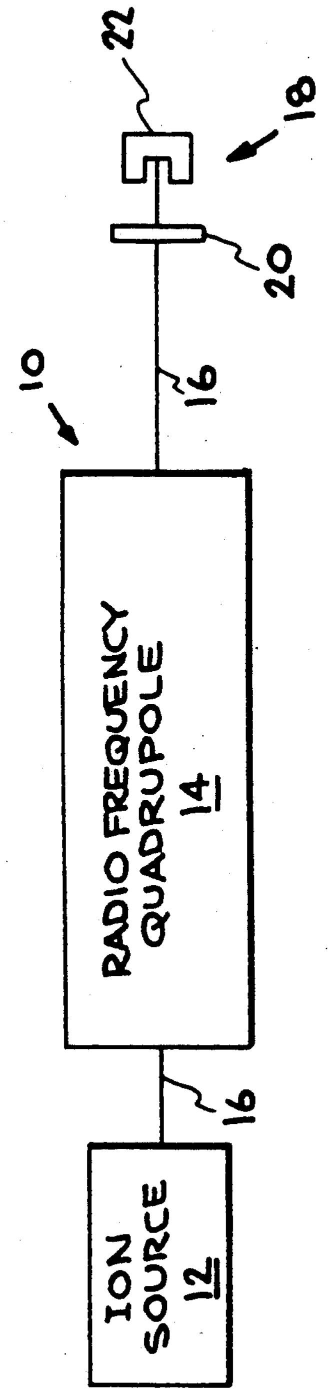
FIG. 1 is a schematic view of a first embodiment of the present invention.

A preferred embodiment 10 of the present invention is illustrated schematically by way of reference to FIG. 1. Embodiment 10 of the invention is useful for the measurement of tritium relative to hydrogen. Embodiment 10 includes an ion source 12, and a radio-frequency quadrupole (RFQ) 14 directly coupled to and axially aligned with the ion source at an angle of zero degrees. Ion source 12 accelerates the ions along a linear path, represented by line 16, which forms the axis for both the ion source and RFQ 14. An energy loss spectrometer 18, including a foil 20 and detector 22, is located along path 16 downstream of RFQ 14.

In preferred embodiment 10, ion source 12 can comprise either a positive or a negative ion source. A typical negative ion source would be a cesium sputter source with multiple sample capability as described in Proctor et al., *Nuclear Instruments and Methods in Physics Research B*52 (1990) 334 or a gas fed ion source as described by Bronk et al., Radiocarbon 31 (1989) 298. A gas fed ion source directly connected to a gas chromatograph would allow real time dose titrations. A possible disadvantage of the gas fed type ion source is that it may be subject to memory effects due to residual gas in the plasma bottle. However, such memory problems could be overcome by the use of multiple plasma bottles.

Radio-frequency quadrupoles (RFQ) such as quadrupole 14 are described in U.S. Pat. Nos. 4,490,648 and 4,801,847, and also U.S. Invention Registration H75. RFQ 14 has the advantage in the context of the present invention of accelerating ions of different mass to different energy levels. In one scenario, if ions entering RFQ 14 from source 12 have an injection energy of 50 keV, a RFQ designed to accelerate species of mass 3 to an energy level of 1.5 MeV would accelerate species of mass 2 to 1.0 MeV, and species of mass 1 to 0.5 MeV. A typical sample would include hydrogen (mass 1), deuterium and $H_2$ (mass 2) and tritium, hydrogen/deuterium, $H_3$ and $^3He$ (mass 3). Species of mass 1 would be accelerated with 31% of the efficiency of species of mass 3, while species of mass 2 would be accelerated with 15% efficiency.

The energy loss spectrometer 18 is axially aligned with ion source 12 and RFQ 14 along path 16. Foil 20, comprising the first stage of spectrometer 18, is thick enough to stop all ions of mass 1, mass 2, and $^3He$ ions but is sufficiently thin so that tritium ions pass through the foil. The second stage of spectrometer 18 is a surface barrier or a scintillation detector 22 which detects the tritium ions which pass through foil 20. Foil 20 is electrically isolated, and the relative concentration of tritium is determined from the ratio of tritium counts in the detector to integrated current from the foil.

Figure 2:
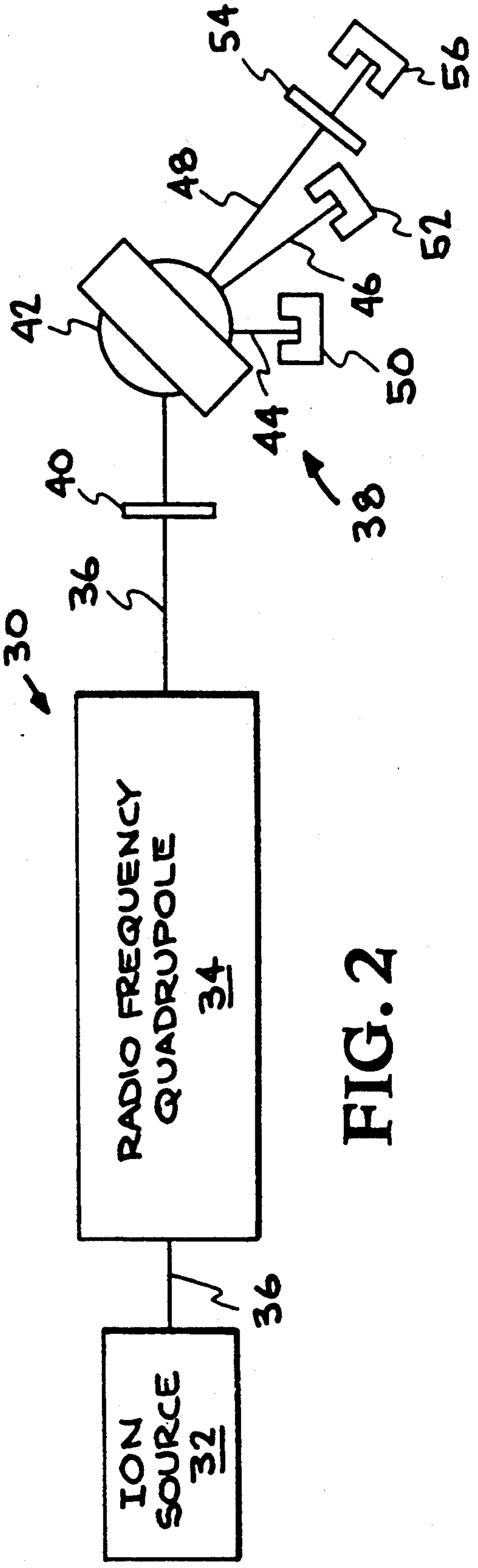
FIG. 2 is a schematic view of a second embodiment of the present invention.

Second embodiment 30 of the present invention is illustrated schematically in FIG. 2, and differs from embodiment 10 in the type of spectrometer used. Embodiment 30 includes an ion source 32 and an axially aligned radio-frequency quadrupole 34 aligned along path 36. The configuration of this part of the system is identical to embodiment 10 shown in FIG. 1. Embodiment 30 includes a spectrometer which combines both the features of momentum and energy loss into a momentum/energy loss spectrometer 38. Spectrometer 38 is again axially aligned with the ion source 32 and quadrupole 34 along path 36. Embodiment 30 is particularly useful where the concentration of tritium relative to both hydrogen and deuterium is of interest.

The first stage of momentum/energy loss spectrometer 38 comprises a thin foil 40 which dissociates the various molecular species. This type of technique is described by Middleton et al., *Nuclear Instruments and Methods in Physics Research,* 847 (1990) 409. A magnet 42 is then used to deflect the ions with different masses along different paths depending on the momentum of the ions, which in turn is dependent on their relative mass. Accordingly, magnet 42 divides the ion beams into beam 44 of ions of mass 1, beam 46 of ions of mass 2, and beam 48 of ions of mass 3. The ions of mass 1 (i.e., hydrogen) are detected by Faraday cup 50, while the ions of mass 2 (i.e., deuterium) are detected by Faraday cup 52. Interposed in the beam 48 of ions of mass 3 is an absorber foil 54 similar to absorber foil 20, for removing $^3He$ ions. A surface barrier detector or a scintillation detector 56 is used to detect the tritium ions.

While preferred embodiments of the invention have been illustrated by way of example, it is apparent that modifications and adaptations of those embodiments will occur to those skilled in the art. It is to be expressly understood that such modifications and adaptations are within the spirit and scope of the present invention, as set forth in the following claims.

What is claimed is:

1. Apparatus for ionizing and accelerating a sample containing molecular species of hydrogen, including tritium, and detecting the concentration of said tritium, comprising:

a source which generates a substantially linear ion beam including ions of tritium from the sample;

a radio-frequency quadropole accelerator directly coupled to and axially aligned with the source, which accelerates species of mass 1, 2, and 3 of the sample to different energy levels along the same axis as the ion beam; and a combination momentum/energy loss spectrometer to measure the concentration of tritium relative to deuterium and hydrogen in the sample, comprising:

a dissociation foil which dissociates the molecular species after the ion beam exits the accelerator, a magnet which divides the molecular species into separate ion beams of mass 1,2, and 3, respectively, detectors for the ion beams of mass 1 and 2, and a third detector which detects tritium ions.

2. The apparatus of claim 1 wherein the source comprises a gas-fed radio-frequency ion source producing a positive ion beam.

3. The apparatus of claim 1 wherein the source comprises a sputter ion source producing a negative ion beam.

4. The apparatus of claim 1, wherein the spectrometer further comprises an electrically isolated foil having a thickness sufficient to absorb species of mass 1 and 2 and $^3He$ ions, but allows tritium ions to pass through the foil, and wherein the third detector is located downstream of the electrically isolated foil.

5. The apparatus of claim 1, wherein the third detector comprises a scintillation detector.

6. The apparatus of claim 1, wherein the third detector comprises a surface barrier detector.

7. The apparatus of claim 1, wherein the detectors for the ion beams of mass 1 and 2 comprise Faraday cups.

8. Apparatus for ionizing and accelerating a sample containing molecular species of hydrogen including hydrogen, deuterium and tritium and detecting the concentration of said tritium relative to both hydrogen and deuterium, said apparatus comprising:

a source which generates a substantially linear ion beam including ions of hydrogen, deuterium and tritium from the sample;

a radio-frequency quadrupole accelerator which accelerates molecular species of mass 1, 2 and 3 to different energy levels, said accelerator being directly coupled to and axially aligned with the source at an angle of substantially zero degrees along the same axis as the ion beam;

a dissociation foil which dissociates the molecular species interposed in the ion beam as it exits the accelerator;

a magnet which divides the molecular species into separate ion beams of mass 1, 2 and 3 respectively; and detectors located downstream of the magnet which detect the relative concentrations of the hydrogen, deuterium and tritium ions.

9. The apparatus of claim 8 wherein the detectors comprise Faraday cups for the ion beams of mass 1 and 2, and an absorber foil for $^3He$ ions and a scintillation detector for tritium ions for the ion beam of mass 3.

10. The apparatus of claim 8 wherein the detectors comprise Faraday cups for the ion beams of mass 1 and 2, and an absorber foil for $^3He$ ions and a surface barrier detector for the ion beam of mass 3.

* * * * *

UNITED STATES PATENT AND TRADEMARK OFFICE

CERTIFICATE OF CORRECTION

PATENT NO. : 5,189,302 
DATED : February 23, 1993
INVENTOR(S) : Mark L. Roberts et al.

It is certified that error appears in the above-identified patent and that said Letters Patent is hereby corrected as shown below:

Title page,
Item [75], inventors should read -- Mark L. Roberts; Jay C. Davis; Robert W. Hamm, all of Livermore, Calif. --

Signed and Sealed this

Second Day of July, 2002

*Attest:*

JAMES E. ROGAN

*Attesting Officer* *Director of the United States Patent and Trademark Office*